(12) United States Patent
Kachalia et al.

(10) Patent No.: US 10,382,274 B2
(45) Date of Patent: Aug. 13, 2019

(54) SYSTEM AND METHOD FOR WIDE AREA ZERO-CONFIGURATION NETWORK AUTO CONFIGURATION

(71) Applicant: Cisco Technology, Inc., San Jose, CA (US)

(72) Inventors: Rahul Kachalia, Cary, NC (US); Saurabh Agarwal, Santa Clara, CA (US); Ankur Bhargava, Pleasanton, CA (US); Saiprasad Muchala, Karnataka (IN); Manoj Narayan, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 34 days.

(21) Appl. No.: 15/659,858

(22) Filed: Jul. 26, 2017

(65) Prior Publication Data
US 2018/0375731 A1   Dec. 27, 2018

Related U.S. Application Data

(60) Provisional application No. 62/524,796, filed on Jun. 26, 2017.

(51) Int. Cl.
*H04L 12/24* (2006.01)
(52) U.S. Cl.
CPC ........ *H04L 41/0886* (2013.01); *H04L 41/046* (2013.01); *H04L 41/28* (2013.01)
(58) Field of Classification Search
CPC .......................... H04L 41/0866; H04L 41/046
See application file for complete search history.

(56) References Cited

U.S. PATENT DOCUMENTS

| | | | |
|---|---|---|---|
| 5,812,773 | A | 9/1998 | Norin |
| 5,889,896 | A | 3/1999 | Meshinsky et al. |
| 6,108,782 | A | 8/2000 | Fletcher et al. |
| 6,178,453 | B1 | 1/2001 | Mattaway et al. |
| 6,298,153 | B1 | 10/2001 | Oishi |
| 6,343,290 | B1 | 1/2002 | Cossins et al. |
| 6,643,260 | B1 | 11/2003 | Kloth et al. |
| 6,683,873 | B1 | 1/2004 | Kwok et al. |

(Continued)

FOREIGN PATENT DOCUMENTS

| | | |
|---|---|---|
| CN | 101719930 | 6/2010 |
| CN | 101394360 | 7/2011 |

(Continued)

OTHER PUBLICATIONS

Amedro, Brian, et al., "An Efficient Framework for Running Applications on Clusters, Grids and Cloud," 2010, 17 pages.

(Continued)

*Primary Examiner* — Parth Patel
(74) *Attorney, Agent, or Firm* — Polsinelli PC

(57) ABSTRACT

Systems, methods, and computer-readable media for implementing zero-configuration networking over a wide area network. Disclosed are systems, methods, and computer-readable storage media for implementing zero-configuration networking over a wire area network by utilizing agents, application programming interfaces (API), and a controller. The controller can implement polices for communication between the agents and APIs, enabling zero-configuration network.

17 Claims, 10 Drawing Sheets

(56) References Cited

U.S. PATENT DOCUMENTS

| | | | |
|---|---|---|---|
| 6,721,804 B1 | 4/2004 | Rubin et al. |
| 6,733,449 B1 | 5/2004 | Krishnamurthy et al. |
| 6,735,631 B1 | 5/2004 | Oehrke et al. |
| 6,996,615 B1 | 2/2006 | McGuire |
| 7,054,930 B1 | 5/2006 | Cheriton |
| 7,058,706 B1 | 6/2006 | Lyer et al. |
| 7,062,571 B1 | 6/2006 | Dale et al. |
| 7,111,177 B1 | 9/2006 | Chauvel et al. |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 | 5/2008 | Williams et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,583,665 B1 | 9/2009 | Duncan et al. |
| 7,602,807 B2 * | 10/2009 | Zadikian ............ H04J 14/0227 370/395.21 |
| 7,606,147 B2 | 10/2009 | Luft et al. |
| 7,644,437 B2 | 1/2010 | Volpano |
| 7,647,594 B2 | 1/2010 | Togawa |
| 7,773,510 B2 | 8/2010 | Back et al. |
| 7,808,897 B1 | 10/2010 | Mehta et al. |
| 7,881,957 B1 | 2/2011 | Cohen et al. |
| 7,917,647 B2 | 3/2011 | Cooper et al. |
| 8,010,598 B2 | 8/2011 | Tanimoto |
| 8,028,071 B1 | 9/2011 | Mahalingam et al. |
| 8,041,714 B2 | 10/2011 | Aymeloglu et al. |
| 8,121,117 B1 | 2/2012 | Amdahl et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,284,664 B1 | 10/2012 | Aybay et al. |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B1 | 5/2013 | Donnellan et al. |
| 8,477,610 B2 | 7/2013 | Zuo et al. |
| 8,495,356 B2 | 7/2013 | Ashok et al. |
| 8,495,725 B2 | 7/2013 | Ahn |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta et al. |
| 8,590,050 B2 | 11/2013 | Nagpal et al. |
| 8,611,356 B2 | 12/2013 | Yu et al. |
| 8,612,625 B2 | 12/2013 | Andreis et al. |
| 8,630,291 B2 | 1/2014 | Shaffer et al. |
| 8,639,787 B2 | 1/2014 | Lagergren et al. |
| 8,656,024 B2 | 2/2014 | Krishnan et al. |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1 | 8/2014 | Chen et al. |
| 8,805,951 B1 | 8/2014 | Faibish et al. |
| 8,850,002 B1 | 9/2014 | Dickinson et al. |
| 8,850,182 B1 | 9/2014 | Fritz et al. |
| 8,856,339 B2 | 10/2014 | Mestery et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,959,526 B2 | 2/2015 | Kansal et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,130,846 B1 | 9/2015 | Szabo et al. |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,478 B2 | 2/2016 | Hon et al. |
| 9,294,408 B1 | 3/2016 | Dickinson et al. |
| 9,313,048 B2 | 4/2016 | Chang et al. |
| 9,361,192 B2 | 6/2016 | Smith et al. |
| 9,379,982 B1 | 6/2016 | Krishna et al. |
| 9,380,075 B2 | 6/2016 | He et al. |
| 9,432,245 B1 | 8/2016 | Sorenson, III et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,571,570 B1 | 2/2017 | Mutnuru |
| 9,613,078 B2 | 4/2017 | Vermeulen et al. |
| 9,628,471 B1 | 4/2017 | Sundaram et al. |
| 9,658,876 B2 | 5/2017 | Chang et al. |
| 9,692,802 B2 | 6/2017 | Bicket et al. |
| 9,755,858 B2 | 9/2017 | Bagepalli et al. |
| 2001/0055303 A1 | 12/2001 | Horton et al. |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0228585 A1 | 12/2003 | Inoko et al. |
| 2004/0004941 A1 | 1/2004 | Malan et al. |
| 2004/0034702 A1 | 2/2004 | He |
| 2004/0088542 A1 | 5/2004 | Daude et al. |
| 2004/0095237 A1 | 5/2004 | Chen et al. |
| 2004/0131059 A1 | 7/2004 | Ayyakad et al. |
| 2004/0197079 A1 | 10/2004 | Latvala et al. |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2006/0062187 A1 | 3/2006 | Rune |
| 2006/0104286 A1 | 5/2006 | Cheriton |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0233106 A1 | 10/2006 | Achlioptas et al. |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0080524 A1 | 4/2008 | Tsushima et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0198858 A1 | 8/2008 | Townsley et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |

(56) References Cited

U.S. PATENT DOCUMENTS

| | | |
|---|---|---|
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0036903 A1 | 2/2010 | Ahmad et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0146438 A1* | 6/2010 | Bush ............... G06F 21/6209 715/810 |
| 2010/0149966 A1 | 6/2010 | Achlioptas et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0019654 A1* | 1/2011 | Harmatos ............ H04W 92/02 370/338 |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0185065 A1 | 7/2011 | Stanisic et al. |
| 2011/0206052 A1 | 8/2011 | Tan et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0283013 A1 | 11/2011 | Grosser et al. |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0036234 A1 | 2/2012 | Staats et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0224206 A1* | 9/2012 | Takahashi ............ G06F 3/1229 358/1.13 |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0201989 A1 | 8/2013 | Hu et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0056146 A1 | 2/2014 | Hu et al. |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |

(56) References Cited

U.S. PATENT DOCUMENTS

| | | | |
|---|---|---|---|
| 2014/0140211 A1 | 5/2014 | Chandrasekaran et al. | |
| 2014/0141720 A1 | 5/2014 | Princen et al. | |
| 2014/0156281 A1* | 6/2014 | Boyd | H04L 12/281 704/275 |
| 2014/0156557 A1 | 6/2014 | Zeng et al. | |
| 2014/0164486 A1 | 6/2014 | Ravichandran et al. | |
| 2014/0188825 A1 | 7/2014 | Muthukkaruppan et al. | |
| 2014/0189095 A1 | 7/2014 | Lindberg et al. | |
| 2014/0189125 A1 | 7/2014 | Amies et al. | |
| 2014/0215471 A1 | 7/2014 | Cherkasova | |
| 2014/0222953 A1 | 8/2014 | Karve et al. | |
| 2014/0244851 A1 | 8/2014 | Lee | |
| 2014/0245298 A1 | 8/2014 | Zhou et al. | |
| 2014/0258481 A1* | 9/2014 | Lundell | H04L 67/34 709/222 |
| 2014/0281173 A1 | 9/2014 | Im et al. | |
| 2014/0282536 A1 | 9/2014 | Dave et al. | |
| 2014/0282611 A1 | 9/2014 | Campbell et al. | |
| 2014/0282889 A1 | 9/2014 | Ishaya et al. | |
| 2014/0289200 A1 | 9/2014 | Kato | |
| 2014/0295831 A1 | 10/2014 | Karra et al. | |
| 2014/0297569 A1 | 10/2014 | Clark et al. | |
| 2014/0297835 A1 | 10/2014 | Buys | |
| 2014/0310391 A1 | 10/2014 | Sorenson, III et al. | |
| 2014/0310417 A1 | 10/2014 | Sorenson, III et al. | |
| 2014/0310418 A1 | 10/2014 | Sorenson, III et al. | |
| 2014/0314078 A1 | 10/2014 | Jilani | |
| 2014/0317261 A1 | 10/2014 | Shatzkamer et al. | |
| 2014/0321278 A1 | 10/2014 | Cafarelli et al. | |
| 2014/0330976 A1 | 11/2014 | van Bemmel | |
| 2014/0330977 A1 | 11/2014 | van Bemmel | |
| 2014/0334488 A1 | 11/2014 | Guichard et al. | |
| 2014/0362682 A1 | 12/2014 | Guichard et al. | |
| 2014/0365680 A1 | 12/2014 | van Bemmel | |
| 2014/0366155 A1 | 12/2014 | Chang et al. | |
| 2014/0369204 A1 | 12/2014 | Anand et al. | |
| 2014/0372567 A1 | 12/2014 | Ganesh et al. | |
| 2014/0379938 A1 | 12/2014 | Bosch et al. | |
| 2015/0033086 A1 | 1/2015 | Sasturkar et al. | |
| 2015/0043576 A1 | 2/2015 | Dixon et al. | |
| 2015/0052247 A1 | 2/2015 | Threefoot et al. | |
| 2015/0052517 A1 | 2/2015 | Raghu et al. | |
| 2015/0058382 A1 | 2/2015 | St. Laurent et al. | |
| 2015/0058459 A1 | 2/2015 | Amendjian et al. | |
| 2015/0058931 A1* | 2/2015 | Miu | H04L 63/126 726/3 |
| 2015/0071285 A1 | 3/2015 | Kumar et al. | |
| 2015/0085870 A1 | 3/2015 | Narasimha et al. | |
| 2015/0089082 A1 | 3/2015 | Patwardhan et al. | |
| 2015/0100471 A1 | 4/2015 | Curry, Jr. et al. | |
| 2015/0103827 A1 | 4/2015 | Quinn et al. | |
| 2015/0106802 A1 | 4/2015 | Ivanov et al. | |
| 2015/0106805 A1 | 4/2015 | Melander et al. | |
| 2015/0117199 A1 | 4/2015 | Chinnaiah Sankaran et al. | |
| 2015/0117458 A1 | 4/2015 | Gurkan et al. | |
| 2015/0120914 A1 | 4/2015 | Wada et al. | |
| 2015/0124622 A1 | 5/2015 | Kovvali et al. | |
| 2015/0138973 A1 | 5/2015 | Kumar et al. | |
| 2015/0178133 A1 | 6/2015 | Phelan et al. | |
| 2015/0189009 A1 | 7/2015 | van Bemmel | |
| 2015/0215819 A1 | 7/2015 | Bosch et al. | |
| 2015/0227405 A1 | 8/2015 | Jan et al. | |
| 2015/0242204 A1 | 8/2015 | Hassine et al. | |
| 2015/0249709 A1 | 9/2015 | Teng et al. | |
| 2015/0263901 A1 | 9/2015 | Kumar et al. | |
| 2015/0280980 A1 | 10/2015 | Bitar | |
| 2015/0281067 A1 | 10/2015 | Wu | |
| 2015/0281113 A1 | 10/2015 | Siciliano et al. | |
| 2015/0309908 A1 | 10/2015 | Pearson et al. | |
| 2015/0319063 A1 | 11/2015 | Zourzouvillys et al. | |
| 2015/0326524 A1 | 11/2015 | Tankala et al. | |
| 2015/0339210 A1 | 11/2015 | Kopp et al. | |
| 2015/0358850 A1 | 12/2015 | La Roche, Jr. et al. | |
| 2015/0365324 A1 | 12/2015 | Kumar et al. | |
| 2015/0373108 A1 | 12/2015 | Fleming et al. | |
| 2016/0011925 A1 | 1/2016 | Kulkarni et al. | |
| 2016/0013990 A1 | 1/2016 | Kulkarni et al. | |
| 2016/0026684 A1 | 1/2016 | Mukherjee et al. | |
| 2016/0062786 A1 | 3/2016 | Meng et al. | |
| 2016/0065364 A1* | 3/2016 | Amiri | H04L 9/0822 380/278 |
| 2016/0094389 A1 | 3/2016 | Jain et al. | |
| 2016/0094398 A1 | 3/2016 | Choudhury et al. | |
| 2016/0094453 A1 | 3/2016 | Jain et al. | |
| 2016/0094454 A1 | 3/2016 | Jain et al. | |
| 2016/0094455 A1 | 3/2016 | Jain et al. | |
| 2016/0094456 A1 | 3/2016 | Jain et al. | |
| 2016/0094480 A1 | 3/2016 | Kulkarni et al. | |
| 2016/0094643 A1 | 3/2016 | Jain et al. | |
| 2016/0099847 A1 | 4/2016 | Melander et al. | |
| 2016/0099853 A1 | 4/2016 | Nedeltchev et al. | |
| 2016/0099864 A1 | 4/2016 | Akiya et al. | |
| 2016/0105393 A1 | 4/2016 | Thakkar et al. | |
| 2016/0127184 A1 | 5/2016 | Bursell | |
| 2016/0134557 A1 | 5/2016 | Steinder et al. | |
| 2016/0156708 A1 | 6/2016 | Jalan et al. | |
| 2016/0164780 A1 | 6/2016 | Timmons et al. | |
| 2016/0164914 A1 | 6/2016 | Madhav et al. | |
| 2016/0182378 A1 | 6/2016 | Basavaraja et al. | |
| 2016/0182619 A1* | 6/2016 | Mann | H04L 67/104 726/12 |
| 2016/0188527 A1 | 6/2016 | Cherian et al. | |
| 2016/0234071 A1 | 8/2016 | Nambiar et al. | |
| 2016/0239399 A1 | 8/2016 | Babu et al. | |
| 2016/0241989 A1* | 8/2016 | Chen | H04W 4/04 |
| 2016/0253078 A1 | 9/2016 | Ebtekar et al. | |
| 2016/0254968 A1 | 9/2016 | Ebtekar et al. | |
| 2016/0261564 A1 | 9/2016 | Foxhoven et al. | |
| 2016/0277368 A1 | 9/2016 | Narayanaswamy et al. | |
| 2017/0005948 A1 | 1/2017 | Melander et al. | |
| 2017/0024260 A1 | 1/2017 | Chandrasekaran et al. | |
| 2017/0026294 A1 | 1/2017 | Basavaraja et al. | |
| 2017/0026470 A1 | 1/2017 | Bhargava et al. | |
| 2017/0041342 A1 | 2/2017 | Efremov et al. | |
| 2017/0054659 A1 | 2/2017 | Ergin et al. | |
| 2017/0097841 A1 | 4/2017 | Chang et al. | |
| 2017/0099188 A1 | 4/2017 | Chang et al. | |
| 2017/0104755 A1 | 4/2017 | Arregoces et al. | |
| 2017/0147297 A1 | 5/2017 | Krishnamurthy et al. | |
| 2017/0149878 A1 | 5/2017 | Mutnuru | |
| 2017/0163531 A1 | 6/2017 | Kumar et al. | |
| 2017/0171158 A1 | 6/2017 | Hoy et al. | |
| 2017/0264663 A1 | 9/2017 | Bicket et al. | |
| 2017/0339070 A1 | 11/2017 | Chang et al. | |
| 2018/0024776 A1* | 1/2018 | Miller | H03M 7/40 711/154 |
| 2018/0241731 A1* | 8/2018 | Guo | H04L 41/00 |
| 2018/0309619 A1* | 10/2018 | Hall | H04W 72/0453 |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.

Author Unknown, "Joint Cisco and VMWare Solution for Optimizing Virtual Desktop Delivery: Data Center 3.0: Solutions to Accel-

(56) References Cited

OTHER PUBLICATIONS erate Data Center Virtualization," Cisco Systems, Inc. and VMware, Inc., Sep. 2008, 10 pages.
Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, a White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, a White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Author Unknown, "Use Cases and Interactions for Managing Clouds, a White Paper from the Open Cloud Standards Incubator," Version 1.0.0, Document No. DSP-ISO0103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Baker, F., "Requirements for IP Version 4 Routers," Jun. 1995, 175 pages, Network Working Group, Cisco Systems.
Beyer, Steffen, "Module "Data::Locations?!"," YAPC::Europe, London, UK,ICA, Sep. 22-24, 2000, XP002742700, 15 pages.
Blanchet, M., "A Flexible Method for Managing the Assignment of Bits of an IPv6 Address Block," Apr. 2003, 8 pages, Network Working Group, Viagnie.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://lwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, CISCO Systems, Jan. 2012, 12 pages.
Ford, Bryan, et al., Peer-to-Peer Communication Across Network Address Translators, In USENIX Annual Technical Conference, 2005, pp. 179-192.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Kumar, S., et al., "Infrastructure Service Forwarding for NSH," Service Function Chaining Internet Draft, draft-kumar-sfc-nsh-forwarding-00, Dec. 5, 2015, 10 pages.
Kunz, Thomas, et al., "OmniCloud—The Secure and Flexible Use of Cloud Storage Services," 2014, 30 pages.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Meraki, "meraki releases industry's first cloud-managed routers," Jan. 13, 2011, 2 pages.
Mu, Shuai, et al., "uLibCloud: Providing High Available and Uniform Accessing to Multiple Cloud Storages," 2012 IEEE, 8 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Quinn, P., et al., "Network Service Header," Internet Engineering Task Force Draft, Jul. 3, 2014, 27 pages.
Quinn, P., et al., "Service Function Chaining (SFC) Architecture," Network Working Group, Internet Draft, draft-quinn-sfc-arch-03.txt, Jan. 22, 2014, 21 pages.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Oper-

(56) References Cited

OTHER PUBLICATIONS ating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Sun, Aobing, et al., "IaaS Public Cloud Computing Platform Scheduling Model and Optimization Analysis," Int. J. Communications, Network and System Sciences, 2011, 4, 803-811, 9 pages.
Szymaniak, Michal, et al., "Latency-Driven Replica Placement", vol. 47 No. 8, IPSJ Journal, Aug. 2006, 12 pages.
Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.
Wikipedia, "Filter (software)", Wikipedia, Feb. 8, 2014, 2 pages, https://en.wikipedia.org/w/index.php?title=Filter_%28software%29&oldid=594544359.
Wikipedia; "Pipeline (Unix)", Wikipedia, May 4, 2014, 4 pages, https://en.wikipedia.org/w/index.php?title=Pipeline2/028Unix%29&oldid=606980114.
Ye, Xianglong, et al., "A Novel Blocks Placement Strategy for Hadoop," 2012 IEEE/ACTS 11$^{th}$ International Conference on Computer and Information Science, 2012 IEEE, 5 pages.

\* cited by examiner

SYSTEM AND METHOD FOR WIDE AREA ZERO-CONFIGURATION NETWORK AUTO CONFIGURATION

CROSS-REFERENCE

This application claims benefit of U.S. provisional application Ser. No. 62/524,796 filed Jun. 26, 2017 and entitled "Wide Area Bonjour Auto Configuration Protocol," which is hereby incorporated by reference in its entirety.

TECHNICAL FIELD

The present technology pertains to zero-configuration networking and more specifically to auto configurations of wide area multicast domain name system in zero-configuration networking.

BACKGROUND

Zero-configuration networking automatically creates a usable computer network between networked devices (e.g., computers, printers, peripherals, etc.) based on the Transmission Control Protocol and Internet Protocol (TCP/IP). Zero-configuration networking includes service discovery, address assignment and hostname resolution. The networked devices can be automatically connected using multicast Domain Name Systems.

Zero-configuration networking over a wide area network can fail when settings are asymmetric, which impact network and service operations in wide area multicast systems. Moreover, modifying settings requires sessions reset and reform in order to active the modified settings, impacting network and service operations.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
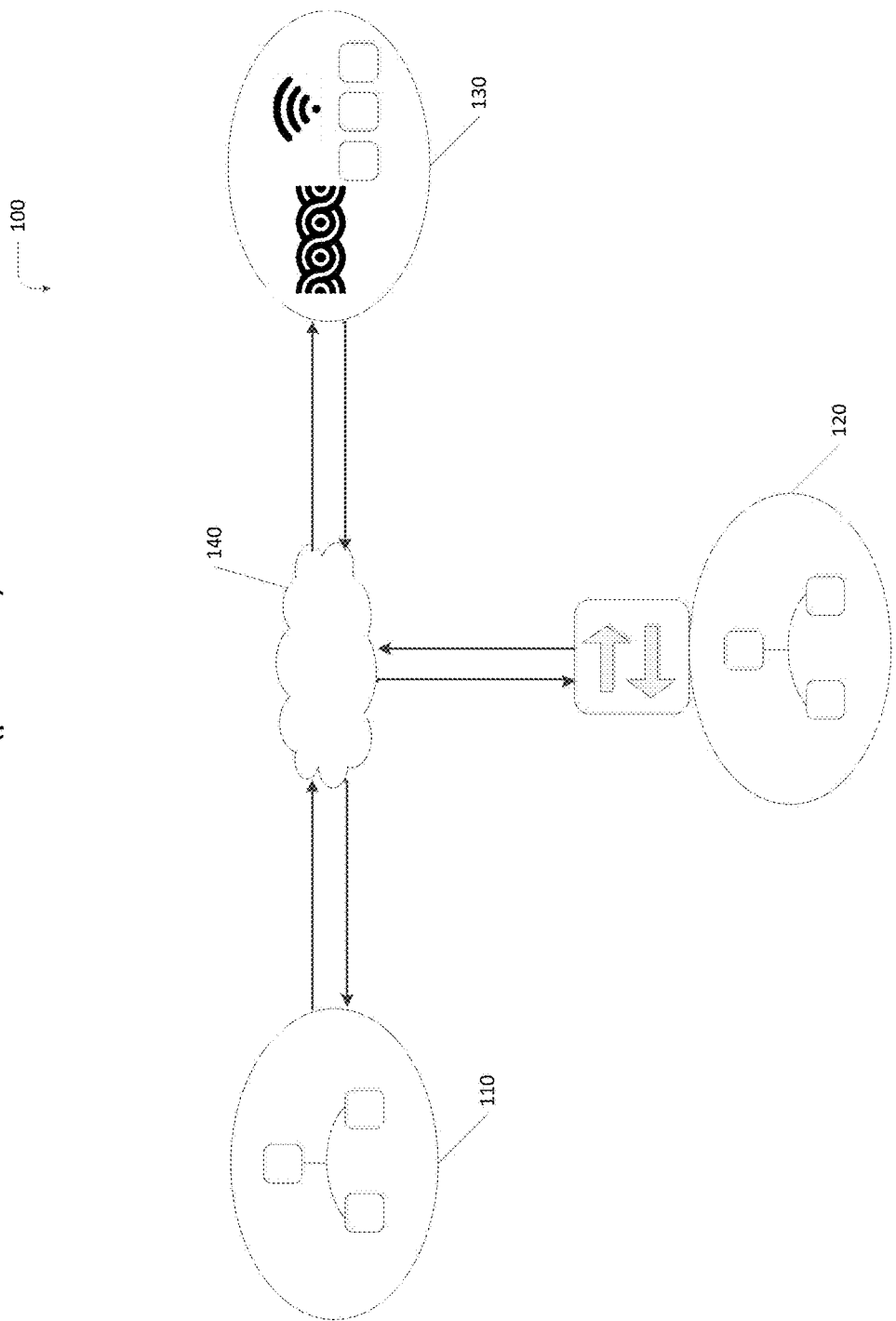
FIG. 1 illustrates a diagram of an example prior art communication network.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to implement an auto configuration protocol in zero-configuration networking over a wide area network. Disclosed are systems, methods, and non-transitory computer-readable storage media auto-configuration of agents from a controller. The systems, methods and computer-readable storage can include receiving, at a controller from an agent, a request for an auto-configuration connection and sending, from the controller to the agent, an acknowledgment of the request. The systems, methods and computer-readable storage can include determining, at the controller, whether the agent is permitted for connection (e.g., by verifying the agent with a trust verify policy) and sending to the agent, a response to the request for the auto-configuration connection. The systems, methods and computer-readable storage can also include receiving, at the controller from the agent, an acknowledgment of the response and establishing an auto-configuration connection between the agent and the controller. In some examples, the connection between the agent and controller can be maintained by utilizing a hello packet over a predetermined interval.

The systems, methods and computer-readable storage can include receiving, at the controller, a change to a parameter of the auto-configuration connection and sending, to the agent, an auto-configuration response including the change and receiving, from the agent, an acknowledgment.

The systems, methods and computer-readable storage can include receiving, at the controller from the agent, one or more requests to connect to one or more other agents connected to the controller, wherein the request is received after the change in the parameter and before the agent has implemented the change in the parameter. In some examples, the controller can allow the one or more requests, when the one or more requests are received within a predetermined time of the auto-configuration response including the change. In other examples the controller can deny the one or more requests, when the one or more requests are received outside a predetermined time of the auto-configuration response including the change and terminating the connection.

The systems, methods and computer-readable storage can include extracting, at the agent, the change from the auto-configuration response and reconfiguring, at the agent, the parameter change.

Description

Figure 2:
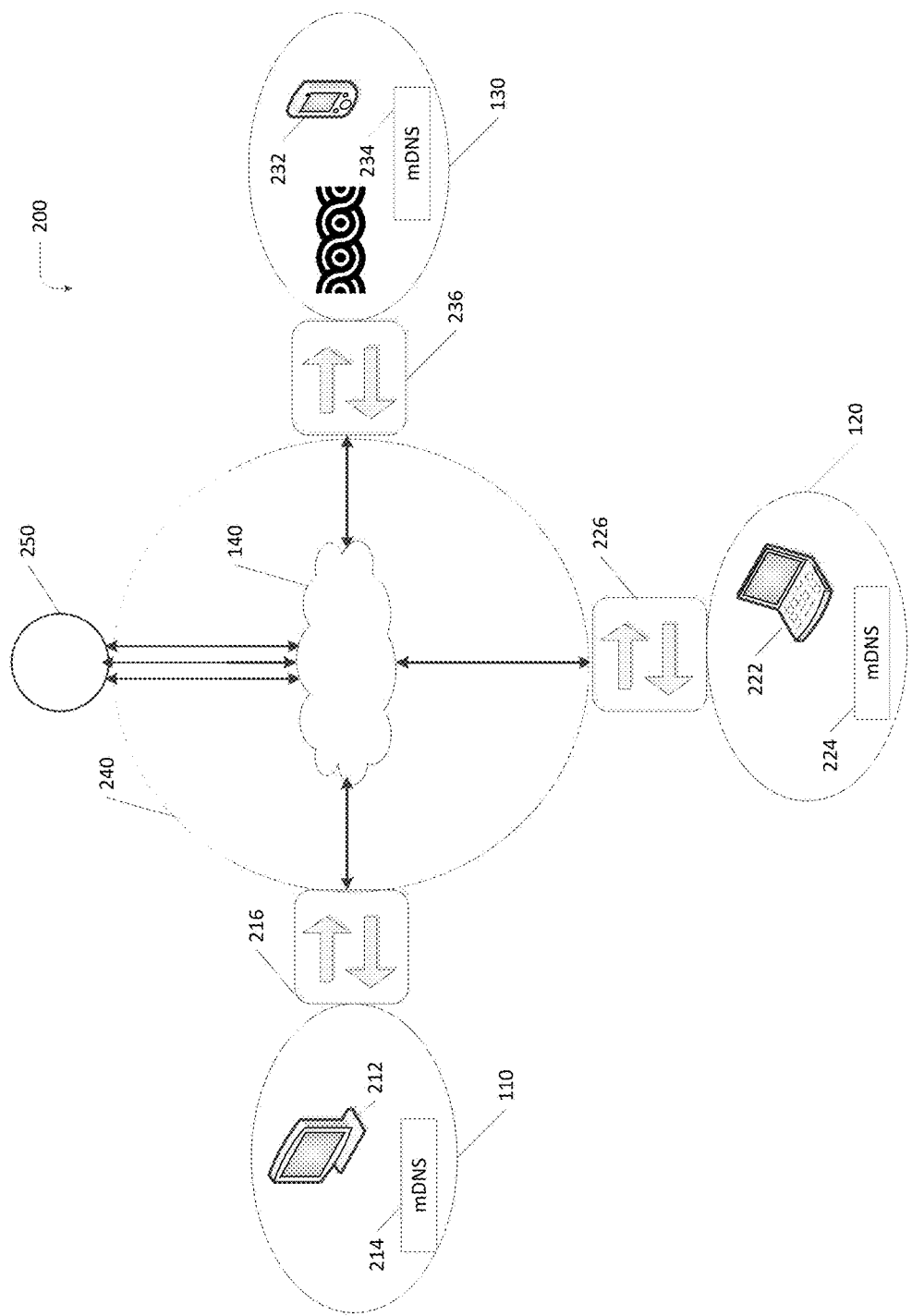
FIG. 2 illustrates a diagram of an example network architecture of a data center.
Figure 9:
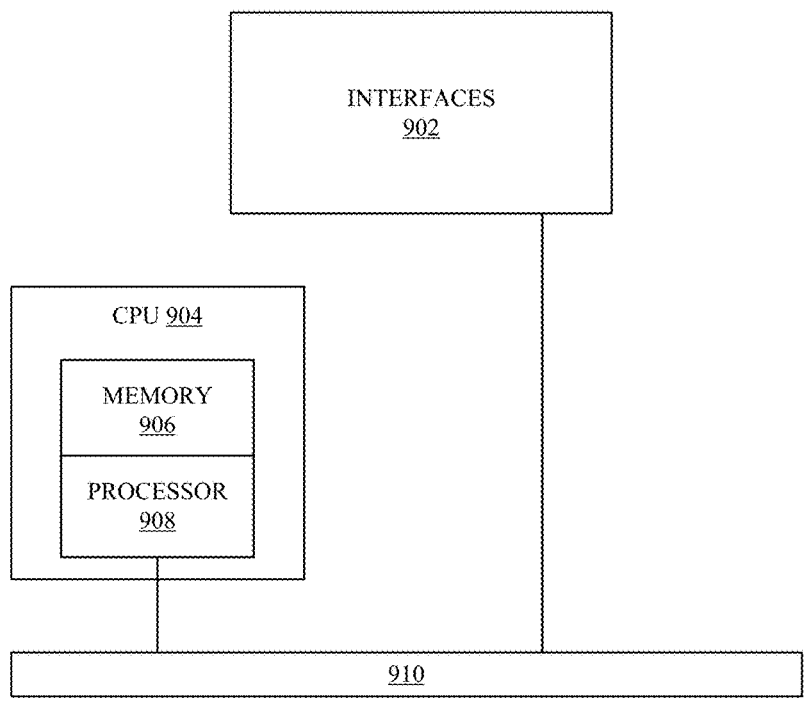
FIG. 9 illustrates an example network device.
Figure 10:
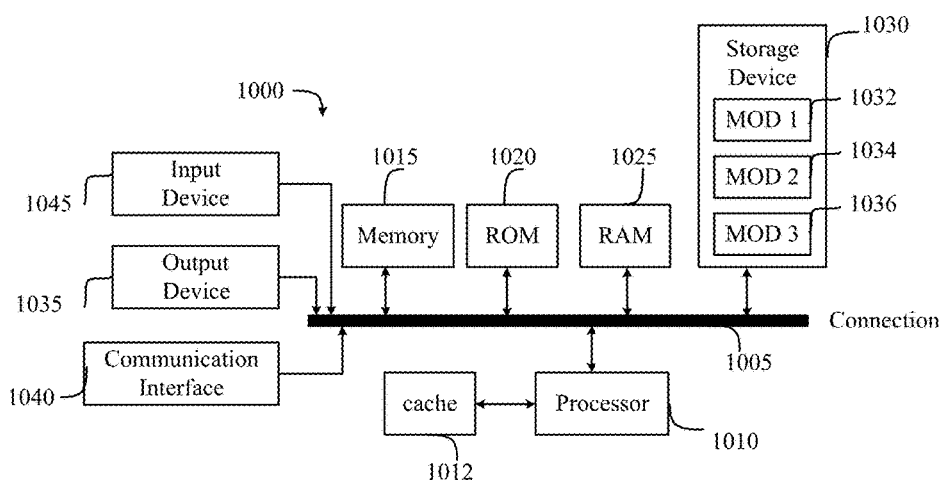
FIG. 10 illustrates an example system embodiment.

The disclosed technology addresses the need in the art for implementing zero-configuration networking over a wide area network. Disclosed are systems, methods, and computer-readable storage media for implementing zero-configuration networking over a wide area network by utilizing agents, application programming interfaces (API), and a controller. The controller can implement polices for communication between the agents and APIs, enabling zero-configuration network. Disclosed is also a auto configuration protocol for centralizing automation of Bonjour Control Protocol attributes used by wide area multicast domain name systems, for example, hello message timer, hold timer, and MD5 password (from controller to agent). The sessions and security configuration of this auto configuration protocol can be fully automated, secured, symmetric and managed from the controller. A description of network computing environments and architectures, as illustrated in FIGS. 1-2, is first disclosed herein. A discussion of session management and flow as illustrated in FIGS. 3-8 will then follow. The discussion then concludes with a description of example devices, as illustrated in FIGS. 9 and 10. These variations shall be described herein as the various embodiments are set forth. The disclosure now turns to FIG. 1.

FIG. 1 is a schematic block diagram of a prior art communication network 100 illustratively including networks 110, 120 and 130. In FIG. 1, networks 110, 120 and 130 are unable automatically configuration communication between devices using a zero-configuration networking.

Figure 3:
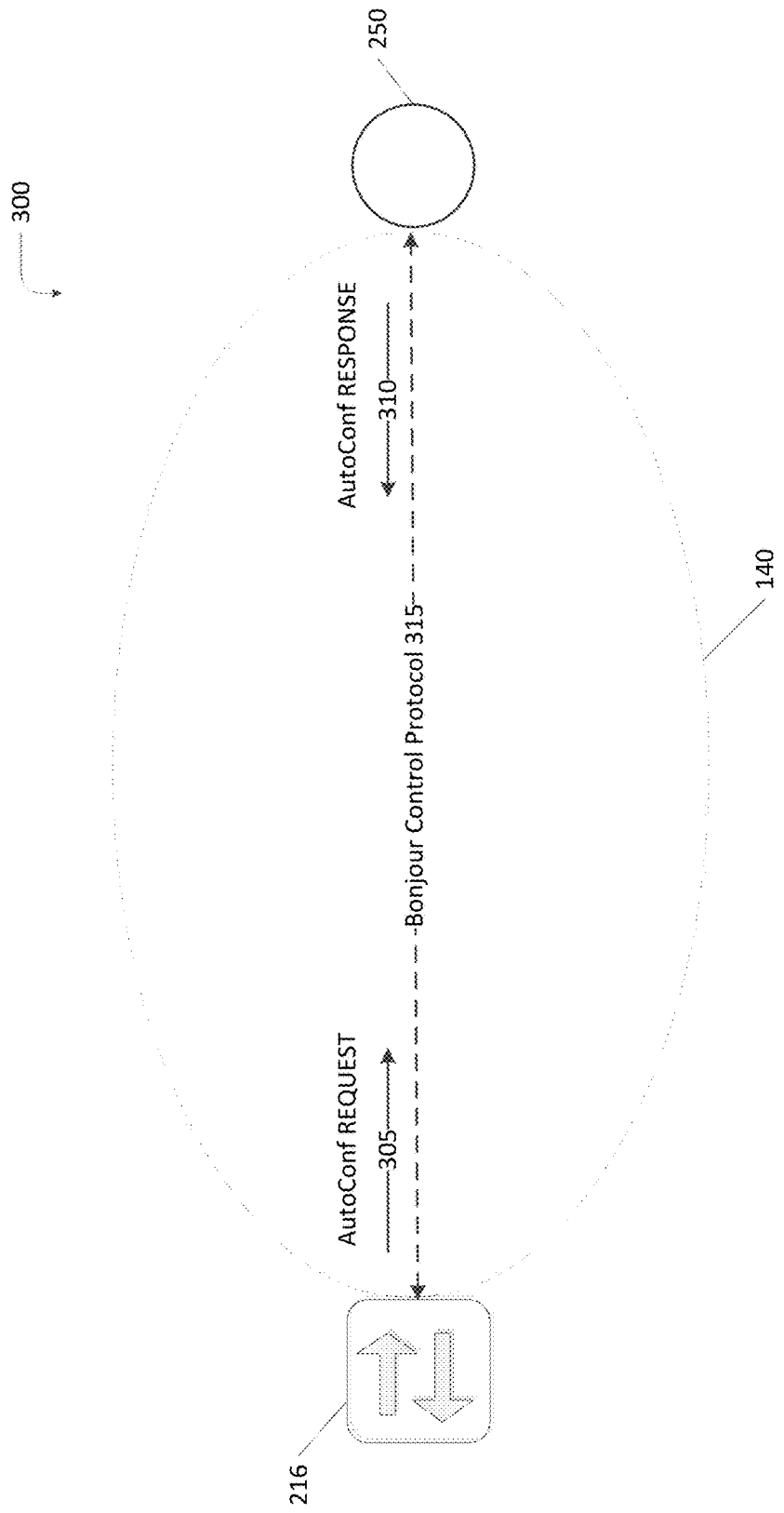
FIG. 3 illustrates a diagram of an example network architecture for an auto configuration control protocol.

FIG. 2 is a schematic block diagram of an example communication network 200 illustratively including networks 110, 120 and 130. Each network (e.g., 110, 120, 130, etc.) can have one or more devices 212, 222, 232 (e.g., servers, computing devices, printers, smart phones, etc.). Each network (e.g., 110, 120, 130, etc.) can run zero-configuration services, including, but not limited to multicast Domain Name System 214, 224, 234 (mDNS). mDNS (e.g., 214, 224, 234, etc.) can resolve host names to IP addresses within small networks that do not include a local name server. Each network (e.g., 110, 120, 130, etc.) can also run one or more zero-configuration agents 216, 226, 23. The one or more agents (e.g., 216, 226, 236) can run on one or more gateways (not shown) and can communicate (e.g., wired, wireless, etc.) with zero configuration Controller 250 over wide area network 140 (e.g., the Internet, etc.). For example, the agents can send an advertisement to the controller, advertising services the devices can provide to other networked devices (e.g., printing, etc.) Once connected, the agents and controller can keep an active connection (e.g., maintain the state), for example, until an agent sends a withdraw messages or a heartbeat is not received at the server from the agent. Controller 250 can execute one or more policies for enabling communication between the devices (e.g., 212, 222, 232, etc.) of the networks (e.g., 110, 120, 130, etc.) via the agents (e.g., 216, 226, 236) as shown in FIG. 3. In some examples, there can be more than one controller. In some examples, the controllers can run in an active/standby configuration. In some examples, the controller can be a distributed system, for example, multiple controllers can operate in a distributed fashion, however, the agents would perceive one controller.

FIG. 3 is a diagram of an example network architecture for an auto configuration control protocol. Network architecture 300 illustrates Agent 216 communicating, via auto configuration control protocol 315, with Controller 250 over wide area network 140. In this example, Agent 216 can send request 305 via the protocol to Controller 250. In response to request 305, Controller 250 can send response 310 via the protocol to Agent 216.

Figure 4:
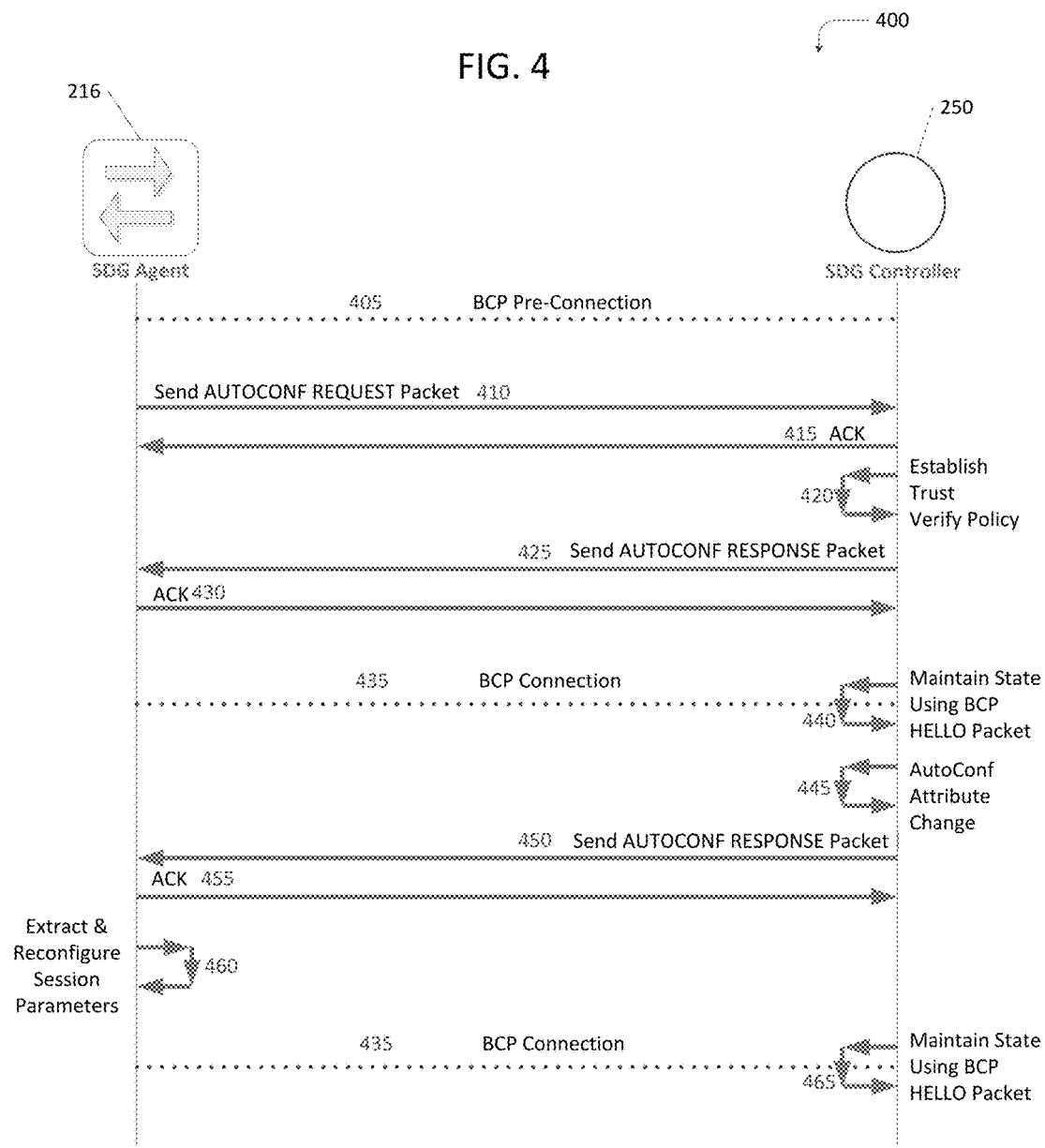
FIG. 4 illustrates a diagram of an example sequence of an auto configuration control protocol.

FIG. 4 is a flow diagram of an example sequence of an auto configuration control protocol. The example sequence has two sections, namely Pre-Connection 405 and Connection 435. In Pre-Connection 405, Agent 216 and Controller 250 are not connected (e.g., no state). In Connection 435, Agent 216 and Controller 250 are connected and the state (e.g., operational) is maintained.

Figure 7:
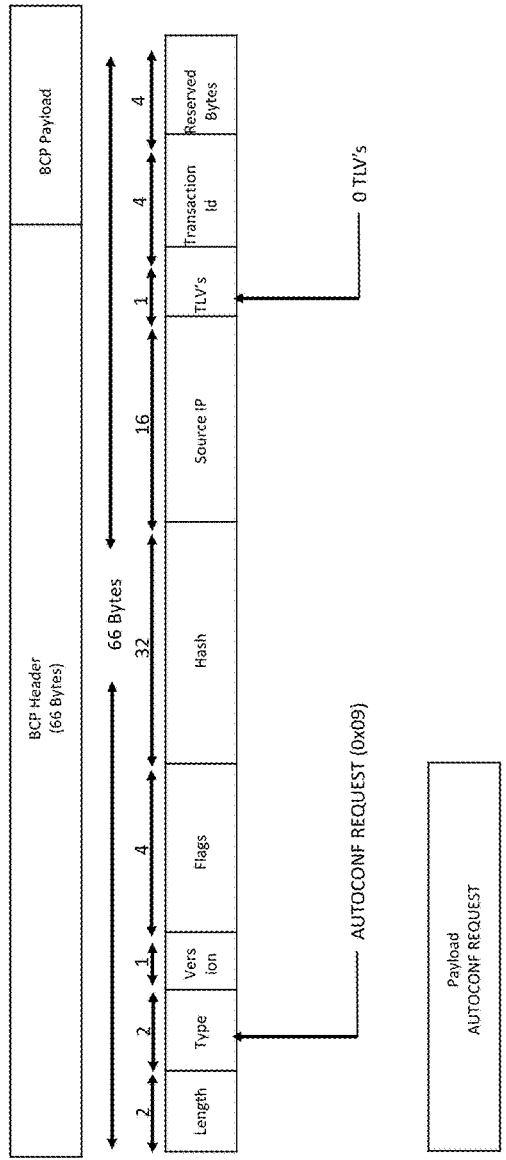

In order for Agent 216 and Controller 250 to be connected, Agent 216 can send an Autoconf Request Packet 410 (as shown in FIG. 7) to Controller 250 to initiate a session. In some example, once connected the agent can dynamically receive key session maintenance attributes from the controller without any user intervention. Controller 250 can send an Acknowledgment Packet 415 in response to receiving Autoconf Request Packet 410. In response to receiving the autoconf request packet, Controller 250 verify the autoconf request (e.g., via a Trust Verify Policy 420). In some examples, the controller can verify the autoconfig request based on implemented "trust" list (e.g., Trust Verify Policy 420). For example, the controller can verify the IP address of the requesting device in a "trust" list. A trust list can be a list of devices authorized for connection with the controller (e.g., determined by an operator). When a device in not in the "trust" list, the controller can, for example, not respond to the request or send an error message.

Figure 8:
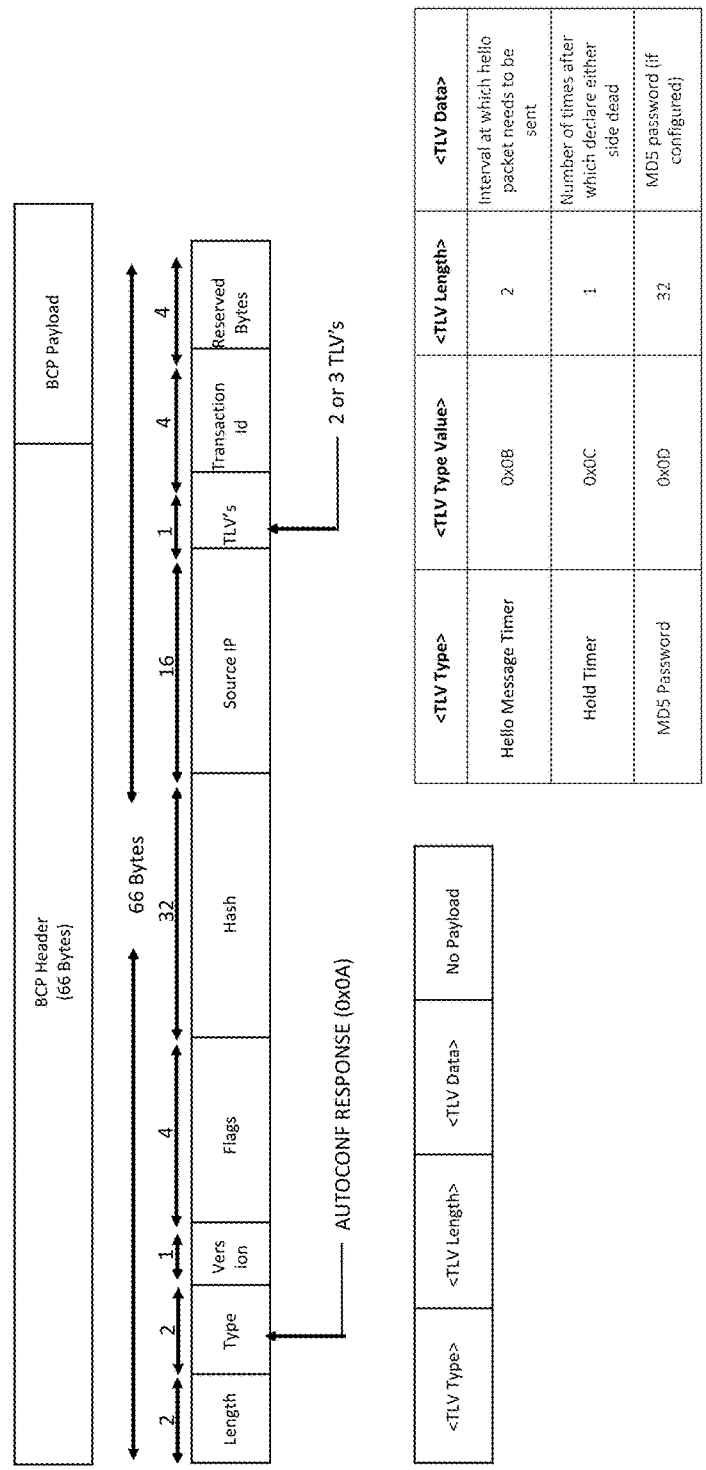

In response to Controller 250 validating the agent, Controller 250 can send Autoconf Response Packet 425 (as shown in FIG. 8) to Agent 216. The autoconf response packet can include one or more parameters (e.g., type-length-value (TLV)). The parameters can be configuration requirements of the controller for the agent. For example, hello, hello message timer, hold timer, password, etc. In some examples, the hello message timer can include a time (e.g., 15 seconds) in which the agent needs to send the controller a hello packet in order to maintain the connection (e.g., state). In other examples, the parameters can include a password (e.g., MD5, hash, etc.) to secure transmissions between the agents and controller. Agent 216 can send an Acknowledgment Packet 430 in response to receiving Autoconf Response Packet 425. When the autoconfig response packet is sent and acknowledgement received, a connection can be established between the agent and controller. In some examples, the initial connection can be the negotiation of an MD5 password.

Figure 6:
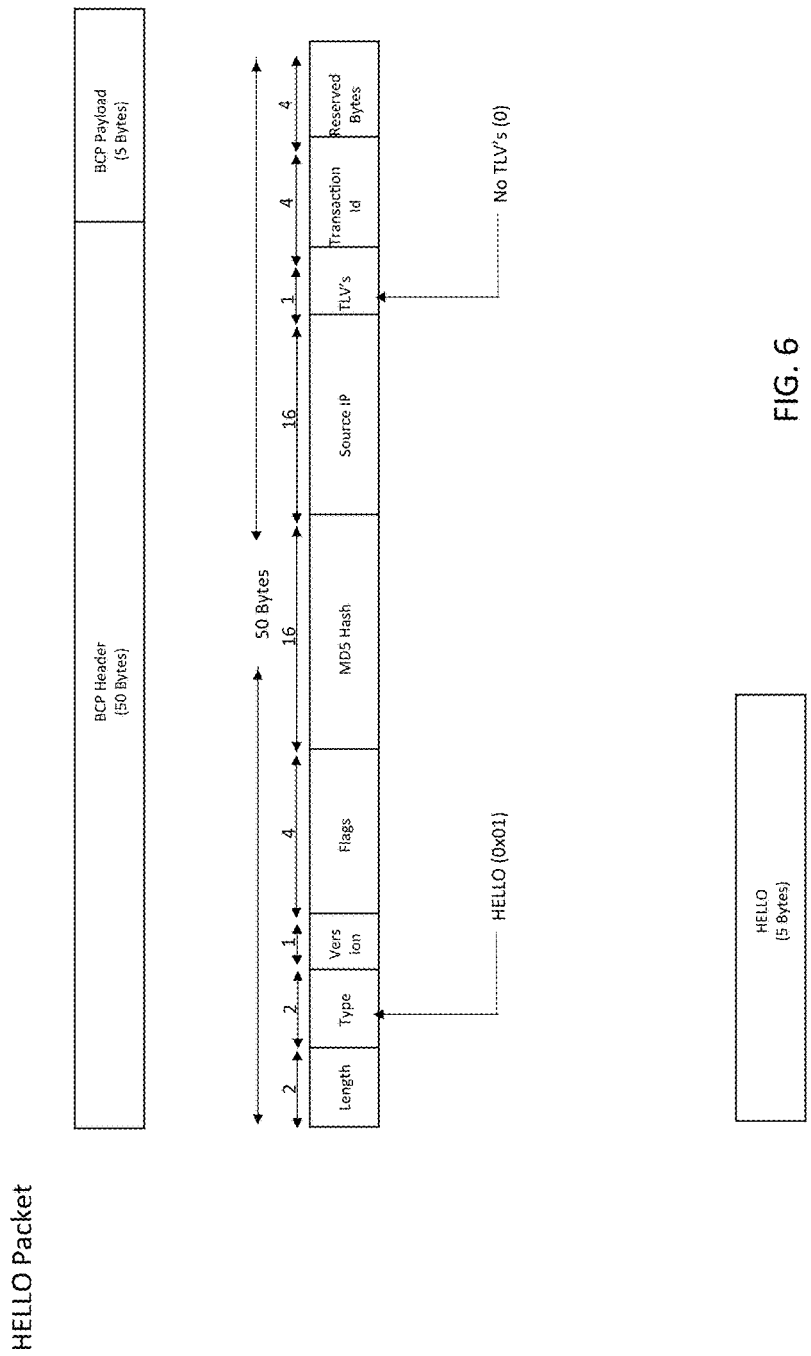

When Agent 216 and Controller 250 have an active Connection 435, Controller 250 can maintain the state between Agent 216 and Controller 250 using a Hello Packet 440 (as shown in FIG. 6). The state can be maintained on a regular basis using hello message timer (e.g., hello message timer—an interval at which hello packet needs to be sent and hold timer—number of times after which either side is declared dead and connection reset).

When in the operational state (e.g., connected) attribute change (e.g., parameter adjustments) may be needed, for example, to maintain symmetric parameters between Controller 250 and Agent 216. As such, when a change is received at Controller 250 (e.g., from a central server, operator, etc.) the change can be resynchronize to update the parameters from the last negotiated state (e.g., between the controller and agents). Autoconf Attribute Change 445 can be received from the operator (e.g., or central server) and applied to the controller, as shown in FIG. 4. For example, Controller 250 can provide a soft-configuration capability to update new parameters without resetting the stateful TCP/IP based connection (e.g., between Controller 250 and Agent 216) and which protects service outage and end-user experience during the parameter updating (e.g., no downtime, loss of services, etc.). The parameter updating can be performed in real-time without impacting service discovery and distribution in wide area zero configuration domain.

In order to synchronize the parameter change, Controller 250 can send Autoconf Response Packet 450 (as shown in FIG. 8) to Agent 216. In some examples, the parameter can be an update of the MD5 password, as previously discussed.

In response, Agent 216 can send an Acknowledgment 455. Based on the received Autoconf Response Packet 450, Agent 216 can extract and reconfigure session parameters without interrupting the connection between Agent 216 and Controller 250. In some examples, the parameter synchronization can take place within a specific time period after received by the agent, such as, when the synchronization will not affect the connection. If the synchronization has not taken place within the specific time period, the connection can be reset. After transmitting Autoconf Response Packet 450, Controller 250 can still accept previous parameters and attributes for a specific amount of time (e.g., until the next hello packet is required to be sent to maintain the state). Controller 250 can maintain state using Hello Packet 465 and after the state is maintained, no longer accept parameters that have not been updated (e.g., pre-Attribute Change 445). If Controller 250 received stale attributes from Agent 216, the state between Controller 250 and Agent 216 can be terminated.

In some examples, an action (e.g., planned, un-planned or event-driven) may trigger the connection (e.g., between Controller 250 and Agent 216) to restart. In response, the agent may initiate a reset message to the controller which can trigger a connection reset. In response, the agent can flush previously negotiated autoconf parameters. The connection re-establishment can initiate an autoconfig request as new connection to build new state-machine with the controller (as shown above)

Figure 5:
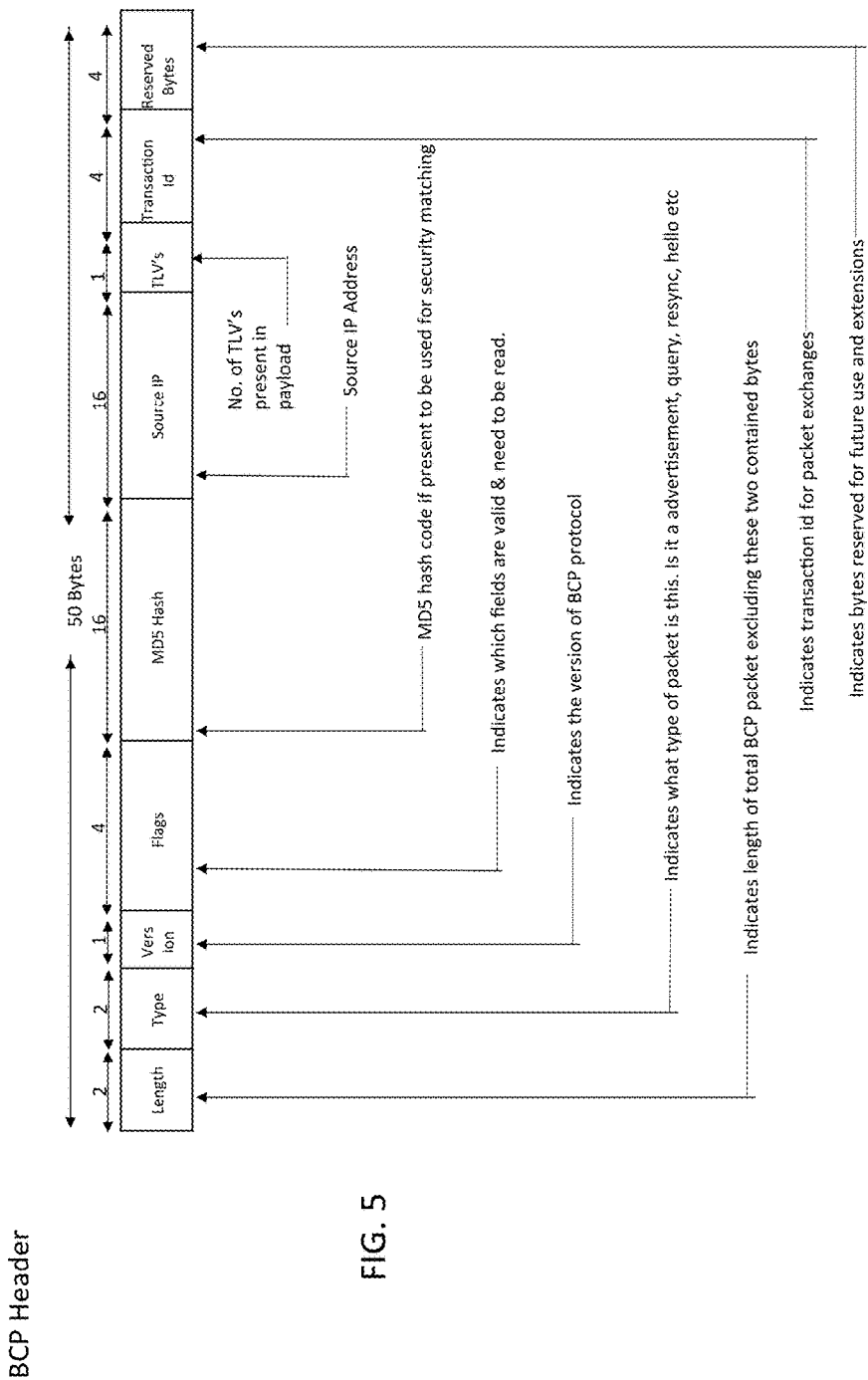
FIGS. 5-8 illustrate example packet structure for communication using an auto configuration control protocol.

The communications above can be facilitated by specific packets as shown through FIGS. 5-8. FIG. 5 illustrates an example detailed view of the BCP header. The BCP header can include a type flag (e.g., hello, autoconf request, autoconf response, etc.). FIG. 6 illustrates an example of the Hello packet. The Hello packet is used to maintain the state between the agents and the controller. The Hello packets are sent at predetermined intervals provided by the controller, for example, at initiation of the state or at an attribute/parameter update. FIG. 7 illustrates the Autoconf Request packet. The Autoconf Request packet is the first packet sent, from an agent to the controller to initiate a connection (and state). FIG. 8 illustrates the Autoconf Response packet. The Autoconf Response packet is sent from the controller to the agent in response to the controller receive an Autoconf Request packet. The Autoconf Response packet can include one or more parameters (e.g., TLV, etc.) that are required to communicate and maintain state with the controller.

The disclosure now turns to the example network device and system illustrated in FIGS. 9 and 10. FIG. 9 illustrates an example network device 910 suitable for routing, switching, forwarding, traffic management, and load balancing. Network device 910 can be, for example, a router, a switch, a controller, a server, a gateway, and/or any other L2 and/or L3 device.

FIG. 9 illustrates an example network device 900 suitable for routing, switching, forwarding, traffic management, and load balancing. Network device 900 can be, for example, a router, a switch, a controller, a server, a gateway, and/or any other L2 and/or L3 device.

Network device 900 can include a master central processing unit (CPU) 904, interfaces 902, and a bus 910 (e.g., a PCI bus). When acting under the control of appropriate software or firmware, the CPU 904 is responsible for executing packet management, error detection, load balancing operations, and/or routing functions. The CPU 904 can accomplish all these functions under the control of software including an operating system and any appropriate applications software. CPU 904 may include one or more processors 908, such as a processor from the Motorola family of microprocessors or the MIPS family of microprocessors. In an alternative embodiment, processor 908 is specially designed hardware for controlling the operations of network device 910. In a specific embodiment, a memory 906 (such as non-volatile RAM and/or ROM) also forms part of CPU 904. However, there are many different ways in which memory could be coupled to the system.

The interfaces 902 are typically provided as interface cards (sometimes referred to as "line cards"). Generally, they control the sending and receiving of data packets over the network and sometimes support other peripherals used with the network device 900. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 904 to efficiently perform routing computations, network diagnostics, security functions, etc.

Although the system shown in FIG. 9 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 906) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 10 shows an example of computing system 1000 in which the components of the system are in communication with each other using connection 1005. Connection 1005 can be a physical connection via a bus, or a direct connection into processor 1010, such as in a chipset or system-on-chip architecture. Connection 1005 can also be a virtual connection, networked connection, or logical connection.

In some embodiments computing system 1000 is a distributed system in which the functions described in this disclosure can be distributed within a datacenter, multiple datacenters, a peer network, throughout layers of a fog network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, read only memory (ROM) 1020 or random access memory (RAM) 1025 to processor 1010. Computing system 1000 can include a cache of high-speed memory 1012 connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output, and also connect computing system 1000 to other nodes in a network. There is no restriction on operating on any particular hardware arrangement and therefore the basic features here may easily be substituted for improved hardware or firmware arrangements as they are developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, battery backed random access memories (RAMs), read only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A method comprising:
    receiving, at a controller from an agent, a request for a Bonjour Control Protocol ("BCP") auto-configuration connection;
    sending, from the controller to the agent, an acknowledgment of the request; determining, at the controller, the agent is permitted for connection;
    sending, from the controller to the agent, a response to the request for the auto-configuration connection;
    receiving, at the controller from the agent, an acknowledgment of the response;
    establishing a BCP auto-configuration connection between the agent and the controller;
    receiving, at the controller, a change to a parameter of the auto-configuration connection;
    receiving, at the controller from the agent, one or more requests to connect to one or more other agents connected to the controller, wherein the request is received after the change in the parameter and before the agent has implemented the change in the parameter; and allowing, at the controller, the one or more requests when the one or more requests are received within a predetermined time of the auto-configuration response including the change.

2. The method of claim 1, further comprising maintaining the connection by utilizing a hello packet over a predetermined interval.

3. The method of claim 1, wherein determining the agent is permitted for connection further comprises verifying the agent with a trust verify policy.

4. The method of claim 1, further comprising:
 sending, to the agent, an auto-configuration response including the change; and
 receiving, from the agent, an acknowledgment.

5. The method of claim 4, further comprising:
 extracting, at the agent, the change from the auto-configuration response; and
 reconfiguring, at the agent, the parameter change.

6. The method of claim 4, further comprising:
 denying, at the controller, the one or more requests when the one or more requests are received outside a predetermined time of the auto-configuration response including the change and terminating the connection.

7. A system comprising:
 a processor; and
 a memory storing computer readable instructions, which when executed by the processor, causes the process to:
  receive, from an agent, a request for a Bonjour Control Protocol ("BCP") auto-configuration connection;
  send, to the agent, an acknowledgment of the request;
  determine the agent is permitted for connection;
  send, to the agent, a response to the request for the auto-configuration connection;
  receive, from the agent, an acknowledgment of the response;
  establishing a BCP auto-configuration connection with the agent;
  receive, at the controller, a change to a parameter of the auto-configuration connection;
  receive, at the controller from the agent, one or more requests to connect to one or more other agents connected to the controller, wherein the request is received after the change in the parameter and before the agent has implemented the change in the parameter; and
  allow, at the controller, the one or more requests when the one or more requests are received within a predetermined time of the auto-configuration response including the change.

8. The system of claim 7, further comprising instructions which when executed by the processor, causes the processor to maintain the connection by utilizing a hello packet over a predetermined interval.

9. The system of claim 7, wherein the determination that the agent is permitted for connection further comprises instructions which when executed by the processor causes the processor to verify the agent with a trust verify policy.

10. The system of claim 7, further comprising instructions which when executed by the processor, causes the processor to:
 send, to the agent, an auto-configuration response including the change; and
 receive, from the agent, an acknowledgment.

11. The system of claim 10, further comprising:
 deny the one or more requests when the one or more requests are received outside a predetermined time of the auto-configuration response including the change and terminating the connection.

12. A non-transitory computer readable medium storing instructions which when executed by a processor, causes the processor to:
 receive, from an agent, a request for a Bonjour Control Protocol ("BCP") auto-configuration connection;
 send, to the agent, an acknowledgment of the request;
 determine the agent is permitted for connection;
 send, to the agent, a response to the request for the auto-configuration connection;
 receive, from the agent, an acknowledgment of the response;
 establishing a BCP auto-configuration connection with the agent;
 receiving, at the controller, a change to a parameter of the auto-configuration connection;
 receiving, at the controller from the agent, one or more requests to connect to one or more other agents connected to the controller, wherein the request is received after the change in the parameter and before the agent has implemented the change in the parameter; and
 allowing, at the controller, the one or more requests when the one or more requests are received within a predetermined time of the auto-configuration response including the change.

13. The non-transitory computer readable medium of claim 12, further comprising instructions which when executed by the processor, causes the processor to maintain the connection by utilizing a hello packet over a predetermined interval.

14. The non-transitory computer readable medium of claim 12, wherein the determination that the agent is permitted for connection further comprises instructions which when executed by the processor causes the processor to verify the agent with a trust verify policy.

15. The non-transitory computer readable medium of claim 12, further comprising instructions which when executed by the processor, causes the processor to:
 send, to the agent, an auto-configuration response including the change; and
 receive, from the agent, an acknowledgment.

16. The non-transitory computer readable medium of claim 15, further comprising instructions which when executed by the processor, causes the processor to:
 extract, at the agent, the change from the auto-configuration response; and
 reconfiguring, at the agent, the parameter change.

17. The non-transitory computer readable medium of claim 15, further comprising:
 deny the one or more requests when the one or more requests are received outside a predetermined time of the auto-configuration response including the change and terminating the connection.

* * * * *